United States Patent
Koehn (10) Patent No.: US 6,398,024 B2
(45) Date of Patent: *Jun. 4, 2002

(54) FOLDED PAPER BOARD CD CARRIER

(75) Inventor: Annalee Koehn, Chicago, IL (US)

(73) Assignee: R. R. Donnelley & Sons Company, Downers Grove, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/796,911

(22) Filed: Mar. 1, 2001

Related U.S. Application Data (63) Continuation of application No. 09/208,938, filed on Dec. 10, 1998, now Pat. No. 6,241,085.

(51) Int. Cl.[7] ............................................. B65D 85/57
(52) U.S. Cl. .................. 206/308.1; 206/312; 206/806
(58) Field of Search ........................ 206/307.1, 308.1, 206/308.3, 309, 311, 312, 806

(56) References Cited

U.S. PATENT DOCUMENTS

| | | |
|---|---|---|
| 1,495,953 A | 5/1924 | Dick |
| 1,554,995 A | 9/1925 | Fetters |
| 2,600,023 A | 6/1952 | Rice |
| 2,615,564 A | 10/1952 | Post |
| 3,303,603 A | 2/1967 | Abeson |
| 3,717,297 A | 2/1973 | Perry |
| 3,785,478 A | 1/1974 | Drori |
| 3,870,223 A | 3/1975 | Wyant |
| 4,049,120 A | 9/1977 | Bower |
| 4,062,447 A | 12/1977 | Gardner |
| 4,159,768 A | 7/1979 | Manis |
| 4,420,112 A | 12/1983 | Cline |
| 4,508,366 A | 4/1985 | Brindle |
| 4,577,889 A | 3/1986 | Schulz |
| 4,709,812 A | 12/1987 | Kosterer |
| 4,743,048 A | 5/1988 | Groswith, III |
| 4,962,951 A | 10/1990 | Mechesney |
| 5,101,973 A | 4/1992 | Martinez |
| 5,154,284 A | 10/1992 | Starkey |
| 5,188,229 A | 2/1993 | Bernstein |
| 5,199,743 A | 4/1993 | Rosinski, III |
| 5,248,032 A | 9/1993 | Sheu et al. |
| 5,307,927 A | 5/1994 | Curtis et al. |
| 5,333,728 A | 8/1994 | O'Brien et al. |
| 5,419,433 A | 5/1995 | Harrer et al. |
| 5,421,453 A | 6/1995 | Harrer et al. |
| 5,472,083 A | 12/1995 | Robinson et al. |
| 5,501,540 A | 3/1996 | Ho |
| 5,620,271 A | 4/1997 | Bergh et al. |
| 5,641,063 A | 6/1997 | Gambardella et al. |
| 5,647,482 A | 7/1997 | Kleinfelder |
| 5,662,217 A | 9/1997 | Durr |
| 5,662,218 A | 9/1997 | Ladwig |
| 5,685,424 A | 11/1997 | Rozek et al. |
| 5,749,463 A | 5/1998 | Collins |
| 5,775,490 A | 7/1998 | Baker et al. |
| 5,882,038 A | 3/1999 | Ong |
| 5,887,714 A | 3/1999 | Yeo |
| 5,988,375 A | 11/1999 | Chang |

*Primary Examiner*—Shian T. Luong
(74) *Attorney, Agent, or Firm*—Marshall, Gerstein & Borun (57) ABSTRACT

A folded paper board compact disc carrier for carrying a plurality of compact discs. A compact disc carrier formed from a single piece of stock comprises a paper board blank having a central portion divided by a fold line into first and second planar portions. Each portion includes a side edge having a tab and a pair of opposing flaps foldable along a fold line lying perpendicular to the central portion fold line. Each flap is foldable to an inward position wherein the flaps define with their corresponding planar half an enclosure adapted to receive a compact disc. Upon folding the first and second planar portions along the central portion told line the enclosures are placed in spaced apart parallel relationship with the side edge tabs of each planar half disposed adjacent each other. The compact disc carrier so formed requires no glue or other adhesives and will hold a plurality of compact discs.

15 Claims, 7 Drawing Sheets

FOLDED PAPER BOARD CD CARRIER

RELATED APPLICATIONS

This application claims continuation from earlier filed U.S. application Ser. No. 09/208,938, filed Dec. 10, 1998, now U.S. Pat. No. 6,241,085.

FIELD OF THE INVENTION

The present invention relates to a folded paper board device for carrying compact discs.

BACKGROUND OF THE INVENTION

Compact discs, which are commonly referred to as "CD's" are generally well known in the art. Standard CD's having a diameter of four and three quarters (4¾) inches are commonly used to store prerecorded music, prerecorded video, and data for reading by a computer. Due to technical advances, a CD can store an incredible amount of data and thus CD's are greatly preferred over other storage mediums, such as magnetic recording tape.

Most CD's are packaged in rigid plastic containers or boxes. The rigid containers serve to protect the CD from inadvertent damage, such as scratching or impact damage. However, in actuality the CD's stored therein are relatively durable and thus do not need such a rigid container. Moreover, the standard container is bulky, has many sharp corners, has a hinge which frequently comes apart or breaks altogether, and is generally disliked by many consumers. Accordingly, many consumers have long desired a more convenient, less bulky and altogether more user friendly alternative for storing CD's.

One solution has been to provide a CD carrier made from paper or from a paperboard material. Such containers are softer, less bulky, and have the added advantage of being made from recycled material. A variety of such folded paper CD carriers have been proposed. For example, U.S. Pat. Nos. 5,419,433 and 5,421,453 show paper board CD carriers formed from a sheet of material which is folded and then glued together to form a pocket sized to hold a CD. However, the gluing process is very difficult to control, and thus many such prior art CD carriers are not well suited for mass production.

Accordingly, there exists a continuing need for an improved paper board CD carrier.

BRIEF DESCRIPTION OF THE DRAWINGS

In the course of the following detailed description, reference will be made to the attached drawings wherein like reference numerals identify like parts and wherein.

DETAILED DESCRIPTION OF THE PREFERRED EMBODIMENT

The embodiment described herein is not intended to limit the scope of the invention to the precise form disclosed. The embodiment has been chosen and described in order to explain the principles of the invention and its practical use in order to enable others skilled in the art to follow its teachings.

Figures 1, 4:
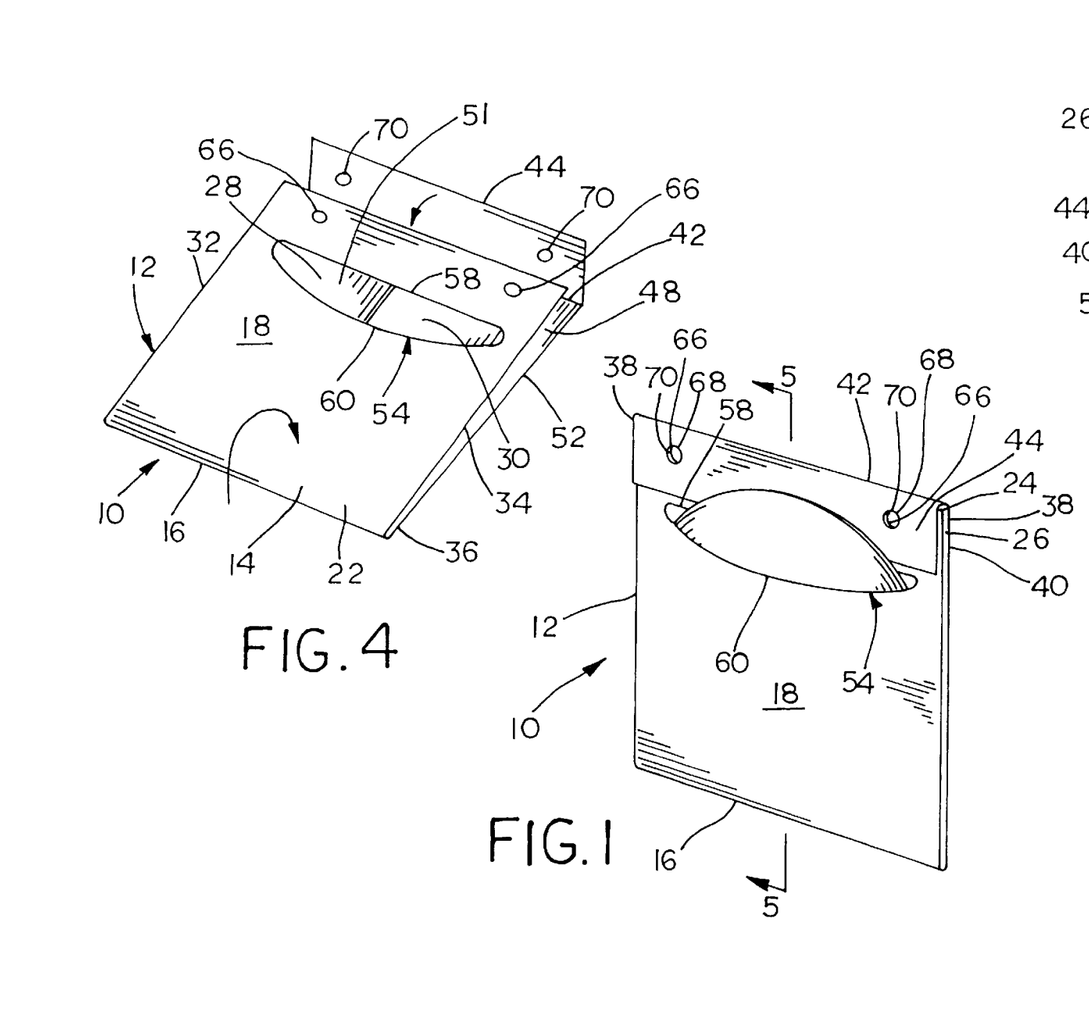
FIG. 1 is a perspective view of a CD carrier constructed in accordance with the teachings of the present invention.
FIG. 4 is a perspective view of the CD carrier of FIGS. 1 through 3 shown with the planar panels being folded along the central fold line and with the locking tab being folded along its fold line.
Figure 2:
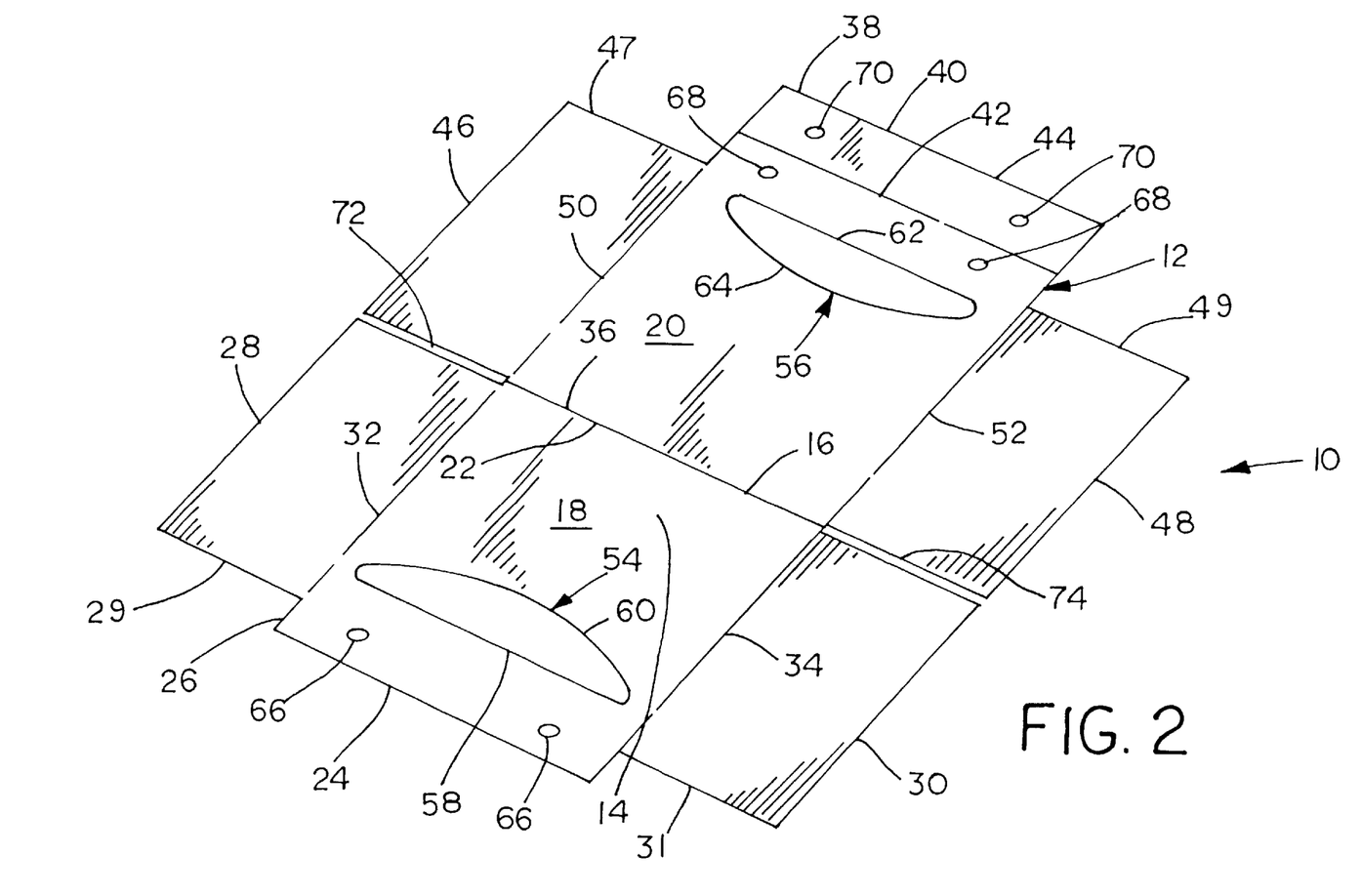
FIG. 2 is a perspective view of the CD carrier of FIG. 1 shown in its unfolded state.

Referring now to FIGS. 1 through 5 of the drawings, a CD carrier constructed in accordance with the teachings of the present invention is generally referred to by the reference numeral 10. As shown in FIG. 2, the CD carrier 10 is constructed of a paper blank 12, which is a single piece of stock and which is preferably constructed of eight (8) point stock. The blank 12 includes a central portion 14 which is generally divided or bisected by a fold line 16 to form a pair of planar panels 18 and 20.

Figure 3:
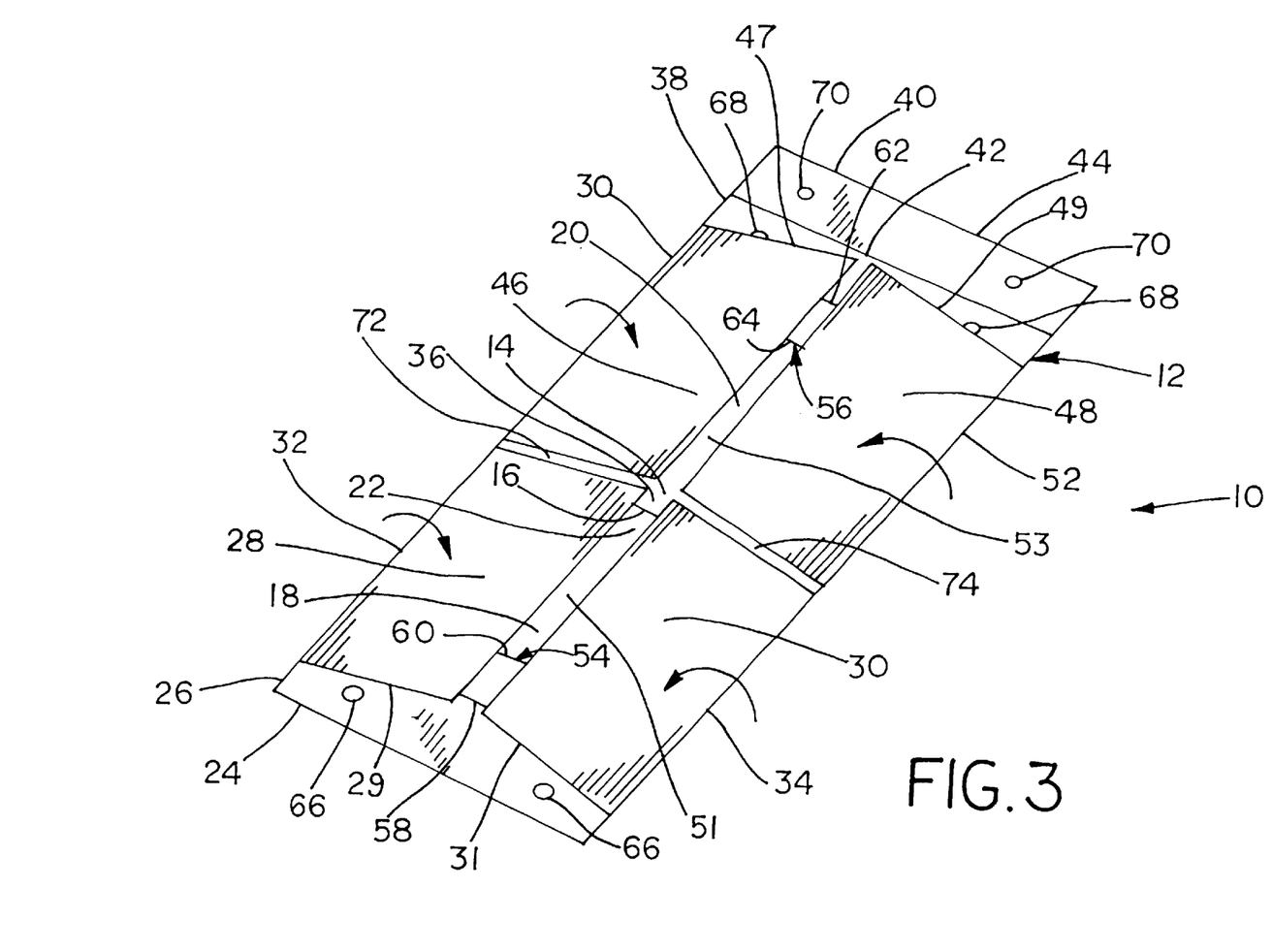
FIG. 3 is a perspective view of the CD carrier of FIGS. 1 and 2 shown in a partially folded state with the edge flaps folded along their respective fold lines.

The panel 18 includes an inside edge 22 lying generally contiguous with the fold line 16 and also includes an outside edge 24. The panel 18 also includes a pair of opposing edge flaps 28, 30, each of which is foldable along a fold line 32, 34, respectively. The fold lines 32, 34 are preferably substantially perpendicular to the fold line 16, with normal angular deviations therefrom being tolerated. The edge flap 28 includes an edge 29, while the flap 30 includes an edge 31. As shown in FIGS. 2 and 3, all or a portion of the outside edge 24 protrudes outwardly past the edges 29, 31 to form a tab 26.

The panel 20 includes an inside edge 36 lying generally contiguous with the fold line 16 and also includes an outside edge 38. The panel 20 includes a pair of opposing end flaps 46, 48, each of which is foldable along a fold line 50, 52, respectively. The fold lines 50, 52 preferably are substantially perpendicular to the fold line 16. Again, normal angular deviations therefrom will be tolerated. The flap 46 includes an edge 47, while the flap 48 includes an edge 49. As shown in FIGS. 2 and 3, all or a portion of the outside edge 38 protrudes outwardly past the edges 29, 31 to form a tab 40. The tab 40 is preferably longer than the tab 26 and includes a fold line 42, such that an outer portion of the tab 40 is foldable along the fold line 42 to form a retaining or locking tab 44.

As shown in FIGS. 3 and 4, the edge flaps 28 and 30 are foldable along the fold lines 32 and 34, respectively. Similarly, the flaps 46 and 48 are inwardly foldable along their respective fold lines 50 and 52. When folded inwardly to the position of FIG. 3, the edge flaps 28 and 30 define with the panel 18 an enclosure 51, while the edge flaps 46 and 48 define with the panel 20 an enclosure 53. Each of the enclosures is sized to hold therein a standard CD such that movement of the CD is substantially prevented. The edge flaps may be slightly longer than ½ of the width of their corresponding panel 18, 20, such that the edge flaps 28, 30 and 46, 48 slightly overlap each other when folded inwardly to the position shown in FIG. 3. Alternatively, the edge flaps 28, 30 and the edge flaps 46, 48 may be sized such that they do not touch or engage each other when folded inwardly. Shorter flaps may be used, but the length disclosed is preferred in that such a length will minimize scratching of CD's held within the carrier 10.

As shown in FIGS. 1 and 4, the blank 12 is folded along the fold line 16 (subsequent to the inward folding of the edge flaps 28, 30, 46 and 48 to create the enclosures 51 and 53).

Each of the panels 18. 20 includes an insert aperture or cutout 54, 56, respectively (see FIG. 2). The cutout 54 includes a generally straight edge 58 with an interconnecting arcuate or curved edge 60, while the cutout 56 includes a generally straight edge 62 with an interconnecting arcuate or curved edge 64. Each of the cutouts 54, 56 are sized so that a standard, commercially available CD having a nominal diameter of 4¾ inches will fit through the cutout. The cutouts 54, 56 will provide an avenue for inserting a CD into the enclosures 51 and 53, respectively.

As can be seen in FIG. 2, a pair of apertures 66 are located on the tab 26 adjacent the edge 24 of half 18, while a pair of apertures 68 are located on tab 40 adjacent the edge 38. Another pair of apertures 70 are located on the locking tab 44. An aperture from each of the pairs of apertures 66, 68 and 70 will be aligned with corresponding apertures from the other pairs when the CD carrier is in the folded state of FIGS. 1 and 5. The apertures 66, 68, and 70 are adapted to permit the CD carrier to be attached to the rings 71 of a ring binder (not shown) or other supporting structure.

Preferably, a cutout 72 is located between adjacent flaps 28 and 46, while a cutout 74 is located between adjacent flaps 30 and 48. Although the cutouts 72 and 74 may be dispensed with, the cutouts 72 and 74 provide for better folding along the fold line 16 by reducing buckling and or bunching of the paper stock when the blank 12 is folded. The cutouts 72, 74 also permit the flap 28 to be folded independently of the flap 46, and permit the flap 30 to be folded independently of the flap 48. Also, preferably, each of the cutouts 54, 56, the apertures 66, 68, and 70, and the cutouts 72 and 74 are formed by stamping of the blank 12 using well accepted and conventional practices.

It will be appreciated that the CD carrier 10 preferably is formed from a single paper blank 12. The cutouts 54, 56, 72, and 74, as well as the apertures 66, 68 and 70 are all preferably stamped or otherwise cut from the blank 12 using well accepted practices as previously mentioned. For purposes of efficiency in forming the CD carrier 10, each of the fold lines 16, 32, 34, 42, 50 and 52 are preferably machine formed using well known and commercially available folding machines and techniques. Alternatively, each of the above-described fold lines may be formed using a series of aligned perforations, or by using other well known methods which may be well suited to forming a foldable line or hinge.

In operation, the CD carrier 10 may be prepared for use as follows. The enclosure 51 is prepared by folding the flaps 28 and 30 inwardly along the fold lines 32 and 34, respectively, while the enclosure 53 is prepared by folding the flaps 46 and 48 inwardly along the fold lines 50, 52, which changes the CD carrier 10 from the configuration shown in FIG. 2 to the configuration shown in FIG. 3. The CD carrier 10 is then folded along the fold line 16 from the configuration shown in FIG. 3 to the configuration shown in FIG. 4, with the side edges 24 and 38, and tabs 26 and 40 being generally adjacent to each other. In such a configuration, corresponding ones of the apertures 66 and 68 are aligned.

Figure 5:
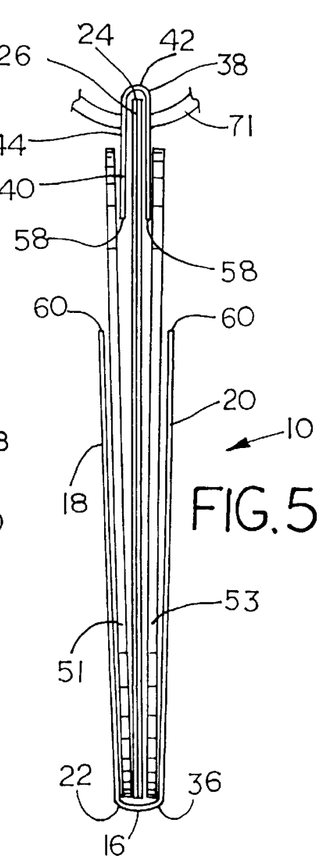
FIG. 5 is a cross-sectional view taken along lines 5—5 of FIG. 1 and showing a CD disposed in each of the spaced apart parallel enclosures; the CD carrier is shown attached to a conventional ring binder.

The locking tab 44 is then folded along the fold line 42 in order to overlap and thus secure the tab 26 in its position adjacent to the tab 40 with the side edges 24 and 38 also disposed adjacent each other. When the locking tab 44 is folded over, the apertures 70 are aligned with corresponding ones of the previously aligned apertures 66 and 68. The CD carrier will now assume the configuration of FIG. 1 with the enclosures 51 and 53 being disposed in generally spaced apart, generally parallel relationship substantially as shown in FIG. 5. A CD (such as is shown in each of FIGS. 1 and 5) may now be inserted into each of the enclosures 51 and 53 through their respective insertion cutouts 54 and 56. Preferably, the CD carrier may now be attached (with or without the CD's inserted therein) to the rings 71 of a ring binder (not shown) for storage and/or transport.

It will be appreciated that the CD carrier 10, by virtue of the above described construction, does not require any glues, adhesives or binders whatsoever, and further does not require any form of mechanical fasteners.

Figure 6:
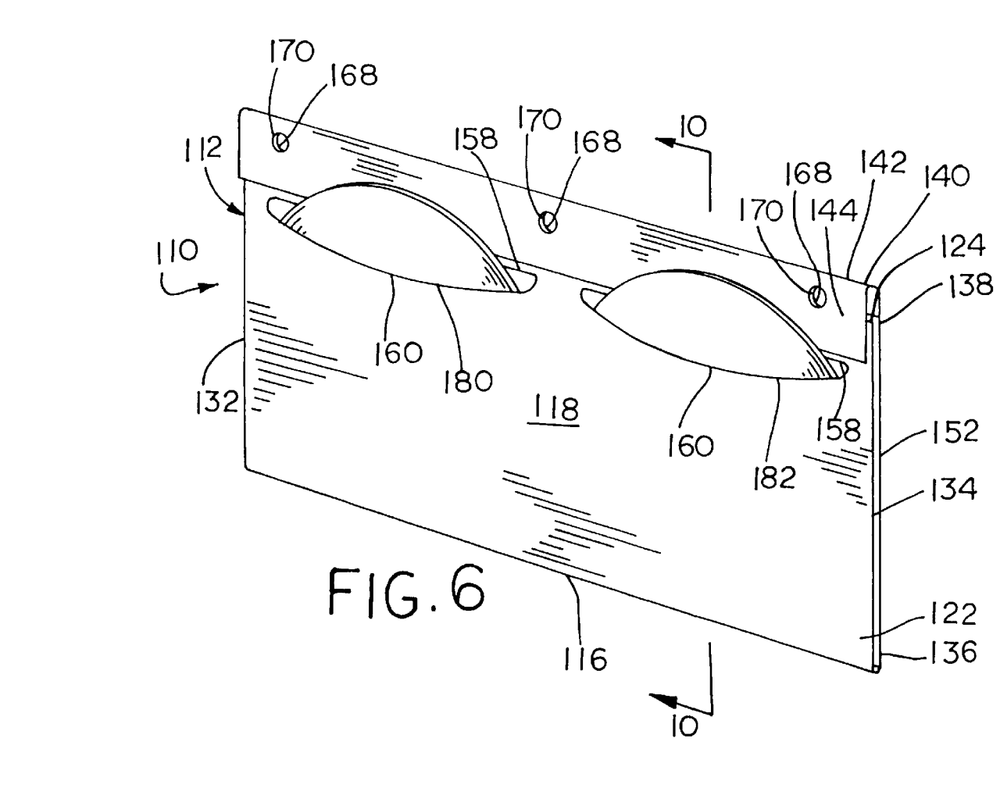
FIG. 6 is a perspective view of a CD carrier constructed in accordance with the teachings of a second embodiment of the present invention.
Figure 7:
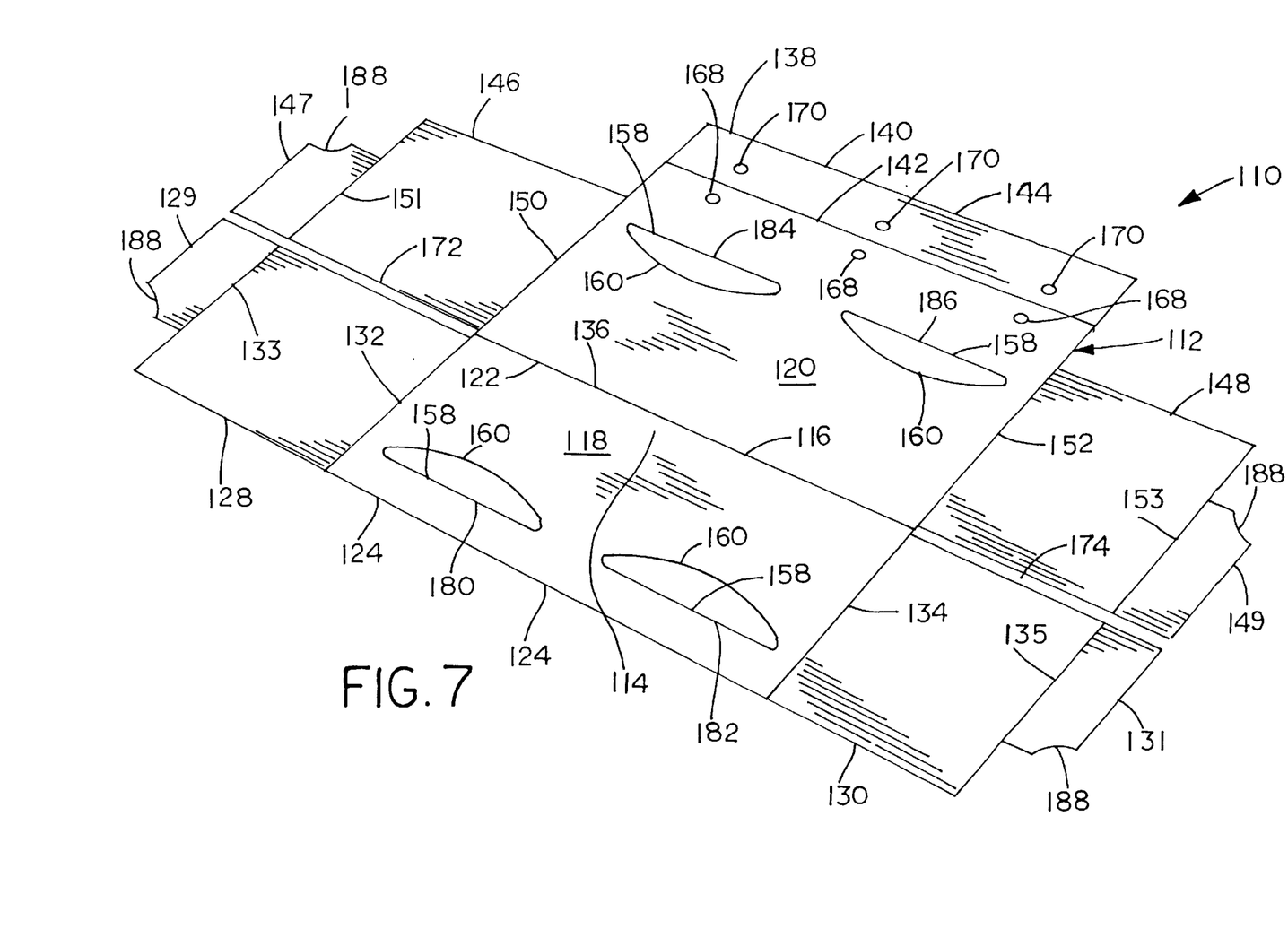
FIG. 7 is a perspective view of the CD carrier of FIG. 6 shown in its unfolded state.

Referring now to the embodiment of FIGS. 6 through 10, a CD carrier constructed in accordance with the teachings of a second embodiment of the present invention is generally referred to by the reference numeral 110. As shown in FIG. 7, the CD carrier 110 is constructed of paper blank 112, which is formed from a single piece of stock and which as outlined above is preferably constructed of eight point stock. The blank 112 includes a central portion 114 which is generally divided or bisected by a fold line 116 to form a pair of planar portions or halves 118 and 120. The planar half 118 includes an inside edge 122 lying generally contiguous with the fold line 116 and also includes an outside edge 124. The planar half 118 also includes a pair of opposing flaps or panels 128, 130, each of which is foldable along a fold line 132, 134, respectively. The fold lines 132, 134 are preferably substantially perpendicular to the fold line 116, with normal angular deviations therefrom being tolerated. Each panel 128, 130 also includes an end tab 129, 131, respectively. Each tab 129, 131 is foldable along a fold line 133, 135, respectively. The fold lines 133, 135 are generally parallel to the fold lines 132, 134.

The planar half 120 includes an inside edge 136 lying generally contiguous with the fold line 116 and further includes an outside edge 138. A portion of the outside edge 138 protrudes outwardly to form a tab 140. The tab 140 includes a fold line 142, such that an outer portion of the tab 140 is foldable along the fold line 142 to form a retaining or locking tab 144. The planar half 120 also includes a pair of opposing flaps or panels 146, 148, each of which is foldable along a fold line 150, 152, respectively. The fold lines 150, 152 preferably are substantially perpendicular to the fold line 116. Each panel 146, 148 also includes an end tab 147, 149, respectively. Each tab 147, 149 is foldable along a fold line 151, 153, respectively. The fold lines 151, 153 are generally parallel to the fold lines 150, 152.

Figure 8:
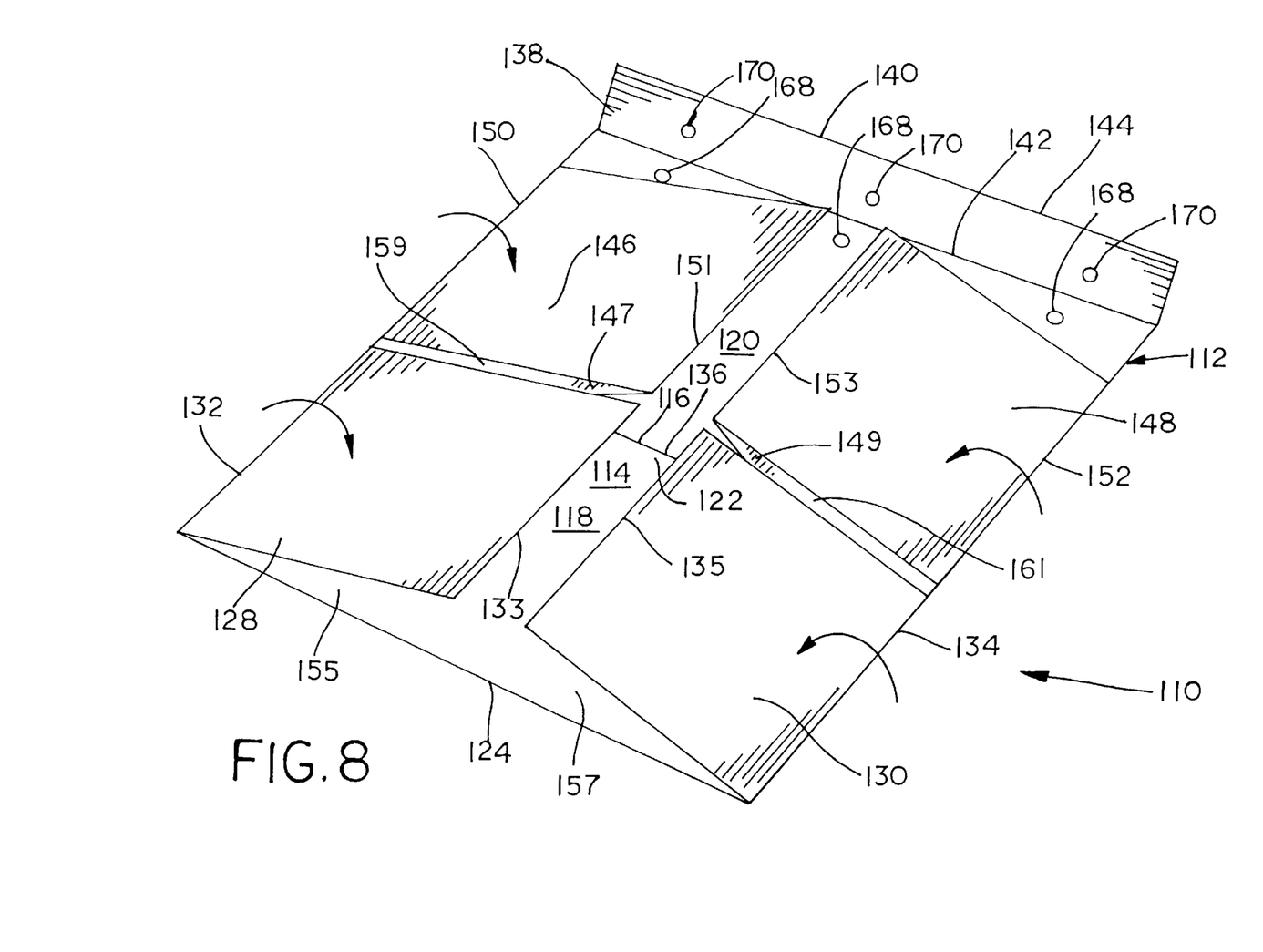
FIG. 8 is a perspective view of the CD carrier of FIGS. 6 and 7 shown in a partially folded state.

As shown in FIGS. 7 and 8, tabs 129, 131, 147 and 149 are inwardly foldable along their respective fold lines 133, 135, 151, and 153. Note that in FIG. 8, by virtue of the cutouts 188, each of the tabs 129 and 131 are concealed from view. Subsequently, the panels 128, 130, 146, and 148 are foldable along their respective fold lines 132, 134, 150, and 152. When folded inwardly to the position of FIGS. 8 and 9, each panel forms with an adjacent portion of its respective planar half an enclosure. Specifically, the panels 128, 130 form enclosures 155, 157 with their respective planar half 118. Similarly, the panels 146, 148 form with their respective planar half 120 the enclosures 159, 161. The end tab 129 serves to define a lateral edge of the enclosure 155, while the tab 131 serves to define a lateral edge of the enclosure 157. Similarly, the tab 147 serves to define a lateral edge of the enclosure 159, while the tab 149 serves to define a lateral edge of the enclosure 161. Each of the enclosures is sized to hold therein a standard CD such that movement of the CD is substantially prevented. Preferably, the panels 128, 130, 146 and 148 are all substantially equal to the diameter of a standard CD, or roughly equal to ½ of the lengthwise dimension of their corresponding planar half 118, 120.

Figure 9:
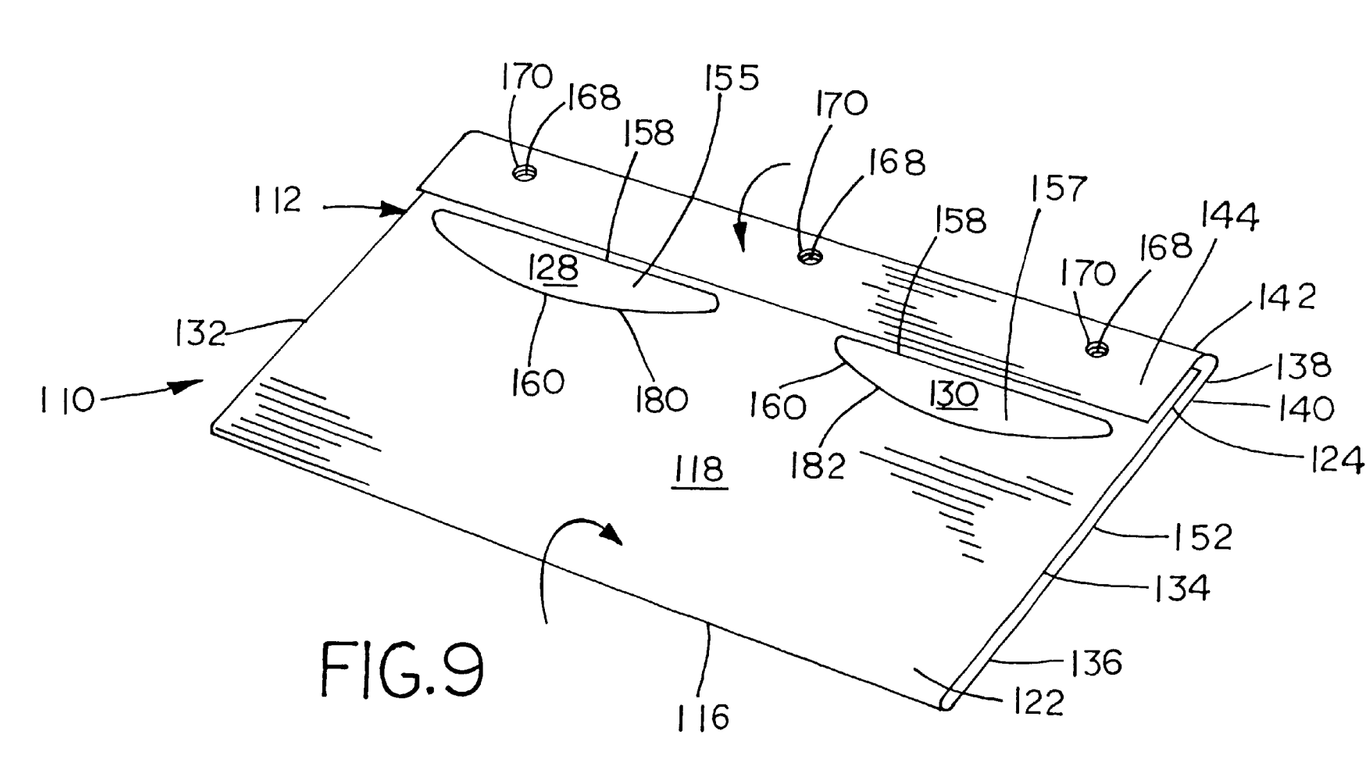
FIG. 9 is a perspective view of the CD carrier of FIGS. 6 through 8 shown with the planar halves being folded along the central fold line and with the locking tab being folded along its fold line.
Figure 10:
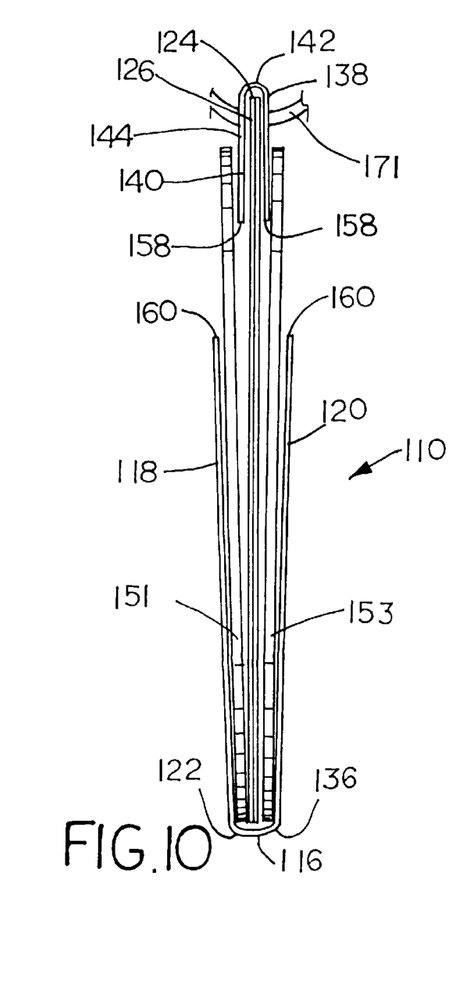
FIG. 10 is a cross-sectional view taken along lines 10—10 of FIG. 6 showing a CD disposed in each of the spaced apart parallel enclosures.

As shown in FIGS. 6, 8 and 9, the enclosures 155, 157, 159, and 161 are created from the blank 112 by first inwardly folding the tabs 129, 131, 147, and 149, followed by the inward folding of the panels 128, 130, 146, and 148. As can be appreciated from FIGS. 7 through 9, when the components described above are folded, the enclosures 155 and 157 are generally coplanar, while the enclosures 159 and 161 are likewise coplanar. It will further be appreciated that the pair of enclosures 155 and 157 is disposed in spaced apart and parallel relationship with the pair of enclosures 159 and 161. The CD carrier 110 is thus equipped to carry four (4) CD's.

The planar half 118 includes a pair of insertion apertures or cutouts 180, 182, while the planar half 120 includes a pair of insertion apertures or cutouts 184, 186. respectively. Each cutout 180, 182, 184, and 186 is sized to receive a standard CD. and includes a generally straight edge 158 with an interconnecting arcuate or curved edge 160. As can be seen in FIG. 7, each of the tabs 129, 131, 147 and 149 includes an arcuate cutout 188, which is located and sized so that none of the tabs will interfere with their adjacent cutouts 180, 182, 184, 186 when the tabs are in the inwardly folded position.

As can be seen in FIGS. 7 and 8, a series of apertures 168 is located on the tab 140 adjacent the edge 138. Another series of apertures 170 is located on the locking tab 144. As can be seen in FIG. 9, the series of apertures 168, 170 will be aligned with each other when the locking tab 144 is folded to the position of FIG. 9. The apertures 168 and 170 are adapted to permit the CD carrier 110 to be attached to the rings of a ring binder (not shown) or other supporting structure.

Preferably, a cutout 172 is located between adjacent panels 128 and 146, while a cutout 174 is located between adjacent panels 130 and 148. Although the cutouts 172 and 174 may be dispensed with, the cutouts 172 and 174 provide for better folding along all of the fold lines by reducing buckling. The cutouts 172, 174 also permit the panels and the tabs to be folded independently of each other.

What is claimed:

1. A compact disc carrier formed from a single piece of paper board stock, the carrier comprising:
   a first panel, the first panel having a pair of opposed edge flaps, each of the flaps of the first panel being inwardly foldable along a fold line to create a first enclosure, the first enclosure sized to receive therein a compact disc, the edge flaps of the first panel being sized so as not to engage each other upon creation of the first enclosure, the edge flaps of the first panel further being unsecured to each other and being unsecured to the first panel except along the corresponding fold lines;
   a second panel, the second panel having pair of opposed edge flaps, each of the flaps of the first panel being inwardly foldable along a fold line to create a second enclosure, the second enclosure sized to receive therein a compact disc, the first and second panels joined to each other along a central fold line, the edge flaps of the second panel being sized so as not to engage each other upon creation of the second enclosure, the edge flaps of the second panel further being unsecured to each other and being unsecured to the second panel, the central fold line being oriented perpendicular to the fold lines of the edge flaps of the first panel and the fold lines of the edge flaps of the second panel except along the corresponding fold lines;
   whereby upon creating the first and second enclosures followed by folding the first and second panels along the central fold line, the first and second enclosures are positioned parallel to each other.

2. The compact disc carrier of claim 1, wherein each of the first and second panels includes an insertion cutout sized to permit placement of a compact disc into each of the first and second enclosures.

3. The compact disc carrier of claim 1, wherein the each of the first and second panels includes an edge tab, the edge tabs of the first and second panels disposed adjacent each other when the first and second panels have been folded along the central fold line, and wherein at least one of the edge tabs includes a locking flap sized to lock the edge tabs together when the first and second panels have been folded along the central fold line.

4. The compact disc carrier of claim 3, wherein the edge tabs of the first and second panels include a plurality of perforations adapted to be secured to a ring binder.

5. A folded paper board compact disc carrier, comprising:
   paperboard blank formed from only a single piece of paperboard stock and divided into first and second panels by a centrally located fold line;
   the first panel including a pair of opposed edge flaps, the edge flaps of the first panel foldable along fold lines disposed generally perpendicular to the centrally located fold line to thereby create a first enclosure, the opposed edge flaps of the first panel sized to not engage each other upon creation of the first enclosure, the first panel and the edge flaps of the first panel sized so that the first enclosure is adapted to receive therein a compact disc;
   the second panel including a pair of opposed edge flaps, the edge flaps of the second panel foldable along fold lines disposed generally perpendicular to the centrally located fold line to thereby create a second enclosure, the opposed edge flaps of the second panel sized to not engage each other upon creation of the second enclosure, the second panel and the edge flaps of the second panel sized so that the second enclosure is adapted to receive therein a compact disc;
   whereby upon creation of the first and second enclosures and upon folding the paperboard blank along the centrally located fold line the first and second enclosures are disposed in spaced apart and generally parallel relationship.

6. The compact disc carrier of claim 5, wherein each of the first and second panels includes an insertion cutout sized to permit placement of a compact disc into each of the first and second enclosures.

7. The compact disc carrier of claim 5, wherein the each of the first and second panels includes an edge tab, the edge tabs of the first and second panels disposed adjacent each other when the paperboard blank has been folded along the centrally located fold line, and wherein at least one of the edge tabs includes locking means for locking the edge tabs together.

8. The compact disc carrier of claim 7, wherein the edge tabs of the first and second panels include a plurality of perforations adapted to be secured to a ring binder.

9. A folded paper board compact disc carrier comprising:

paperboard blank divided into first and second panels by a central fold line;

the first panel including a pair of opposed edge flaps, the edge flaps of the first panel foldable to an inward position along edge panel fold lines disposed generally perpendicular to the central fold line, the edge flaps of the first panel defining a first enclosure when in the inward position;

the second panel including a pair of opposed edge flaps, the edge flaps of the second panel foldable to an inward position along edge fold lines disposed generally perpendicular to the central fold line, the edge flaps of the second panel defining a second enclosure when in the inward position; and means for maintaining the edge flaps of the first and second panels in their inward positions, the means being defined solely by contact between the edge flaps of the first panel and the edge flaps of the second panel, the contact occuring upon folding each of the edge flaps to the inward position followed by folding the paperboard blank along the central fold line.

10. The compact disc carrier of claim 9, wherein each of the first and second panels includes an insertion cutout sized to permit placement of a compact disc into each of the first and second enclosures.

11. The compact disc carrier of claim 9, wherein the each of the first and second panels includes an edge tab, the edge tabs of the first and second panels disposed adjacent each other when the paperboard blank has been folded along the central fold line, and wherein at least one of the edge tabs includes locking means for locking the edge tabs together.

12. The compact disc carrier of claim 9, including means defined by cooperating edges of the first panel and the second panel for securing the carrier to a ring binder.

13. A method of carrying compact discs, comprising:

providing a paperboard blank;

forming a central fold line in the paperboard blank to create a first panel and a second panel separated by the central fold line;

folding side edge portions of the first panel along fold lines disposed perpendicular to the central fold line to form a first pair of opposed edge flaps;

folding side edge portions of the second panel along fold lines disposed perpendicular to the central fold line to form a second pair of opposed edge flaps;

creating a first enclosure by folding the first pair of opposed edge flaps along the fold lines of the first panel to an inward position;

maintaining the side edge portions of the first pair of opposed edge flaps in the inward position without engagement between the side edge portions;

creating a second enclosure by folding the second pair of opposed edge flaps along the fold lines of the second panel to an inward position;

maintaining the side edge portions of the second pair of opposed edge flaps in the inward position without engagement between the side edge portions;

folding the paperboard blank along the central fold line so that the first enclosure and the second enclosure are in a spaced apart generally parallel position; and securing the enclosures in the spaced apart generally parallel position.

14. A folded paper board compact disc carrier, comprising:

paperboard blank formed from only a single piece of paperboard stock and divided into first and second panels by a centrally located fold line;

the first panel including a pair of similarly sized opposed edge flaps, the edge flaps of the first panel foldable along fold lines disposed generally perpendicular to the centrally located fold line to thereby create a first enclosure sized to receive a compact disc, the opposed edge flaps of the first panel remaining in non-adhering relation to each other upon creation of the first enclosure;

the second panel including a pair of similarly sized opposed edge flaps, the edge flaps of the second panel foldable along fold lines disposed generally perpendicular to the centrally located fold line to thereby create a second enclosure sized to receive a compact disc, the opposed edge flaps of the second panel remaining in non-adhering relation to each upon creation of the second enclosure;

whereby upon creation of the first and second enclosures and upon folding the paperboard blank along the centrally located fold line the first and second enclosures are disposed in spaced apart and generally parallel relationship.

15. The compact disc carrier of claim 14, wherein the edge flaps of the first panel and the edge flaps of the second panel are all identically sized.

* * * * *

UNITED STATES PATENT AND TRADEMARK OFFICE
CERTIFICATE OF CORRECTION

PATENT NO.      : 6,398,024 B2
DATED           : June 4, 2002
INVENTOR(S)     : Annalee Koehn It is certified that error appears in the above-identified patent and that said Letters Patent is hereby corrected as shown below:

<u>Title page,</u>
Item [57], ABSTRACT,
Line 11, delete "told" and insert -- fold --.

Signed and Sealed this

Twenty-seventh Day of August, 2002

*Attest:*

*Attesting Officer*

JAMES E. ROGAN
*Director of the United States Patent and Trademark Office*